US009657200B2

(12) United States Patent
Huang et al.

(10) Patent No.: US 9,657,200 B2
(45) Date of Patent: *May 23, 2017

(54) WATERBORNE ADHESIVES FOR REDUCED BASIS WEIGHT MULTILAYER SUBSTRATES AND USE THEREOF

(71) Applicant: HENKEL IP & HOLDING GMBH, Duesseldorf (DE)

(72) Inventors: Tianjian Huang, Hillsborough, NJ (US); Kristina Thompson, Clinton, NJ (US); Daniel Waski, Elmhurst, IL (US); John Meccia, Ringoes, NJ (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/826,451

(22) Filed: Mar. 14, 2013

(65) Prior Publication Data

US 2014/0087177 A1 Mar. 27, 2014

Related U.S. Application Data

(60) Provisional application No. 61/706,447, filed on Sep. 27, 2012.

(51) Int. Cl.
| | |
|---|---|
| *C09J 11/00* | (2006.01) |
| *C09J 11/08* | (2006.01) |
| *B32B 27/08* | (2006.01) |
| *B32B 27/10* | (2006.01) |
| *B32B 27/32* | (2006.01) |
| *B32B 7/12* | (2006.01) |
| *C08K 7/22* | (2006.01) |
| *D21H 17/54* | (2006.01) |
| *D21H 17/37* | (2006.01) |
| *D21H 21/54* | (2006.01) |
| *D21H 27/30* | (2006.01) |
| *D21H 17/36* | (2006.01) |
| *B32B 37/12* | (2006.01) |
| *B32B 29/00* | (2006.01) |
| *D21H 17/57* | (2006.01) |

(52) U.S. Cl.
CPC ............... *C09J 11/08* (2013.01); *B32B 7/12* (2013.01); *B32B 27/08* (2013.01); *B32B 27/10* (2013.01); *B32B 27/32* (2013.01); *B32B 29/005* (2013.01); *B32B 37/1207* (2013.01); *C09J 11/00* (2013.01); *D21H 17/36* (2013.01); *D21H 17/37* (2013.01); *D21H 17/57* (2013.01); *D21H 21/54* (2013.01); *D21H 27/30* (2013.01); *B32B 2255/10* (2013.01); *B32B 2255/12* (2013.01); *B32B 2255/26* (2013.01); *B32B 2305/54* (2013.01); *B32B 2307/30* (2013.01); *B32B 2307/304* (2013.01); *B32B 2307/306* (2013.01); *B32B 2307/50* (2013.01); *B32B 2307/54* (2013.01); *B32B 2317/12* (2013.01); *B32B 2439/00* (2013.01); *B32B 2439/02* (2013.01); *B32B 2439/06* (2013.01); *B32B 2439/40* (2013.01); *B32B 2439/46* (2013.01); *B32B 2439/62* (2013.01); *B32B 2439/70* (2013.01); *C08K 7/22* (2013.01); *C09J 2205/11* (2013.01); *Y10T 428/25* (2015.01)

(58) Field of Classification Search
None
See application file for complete search history.

(56) References Cited

U.S. PATENT DOCUMENTS

| | | | |
|---|---|---|---|
| 3,253,064 | A | 5/1966 | Buonaiuto |
| 3,563,851 | A | 2/1971 | Armour et al. |
| 4,005,033 | A | 1/1977 | Georgeau et al. |
| 4,006,273 | A | 2/1977 | Wolinski et al. |
| 4,350,788 | A | 9/1982 | Shimokawa et al. |
| 5,264,467 | A | 11/1993 | DiStefano |
| 5,356,683 | A | 10/1994 | Egolf et al. |
| 5,928,741 | A | 7/1999 | Andersen et al. |
| 6,139,961 | A | 10/2000 | Blankenship et al. |
| 6,231,970 | B1 | 5/2001 | Andersen et al. |
| 6,255,369 | B1 | 7/2001 | Philbin et al. |
| 6,379,497 | B1 | 4/2002 | Sandstrom et al. |
| 6,648,955 | B1 | 11/2003 | Swiezkowski et al. |
| 6,740,373 | B1 | 5/2004 | Swoboda et al. |
| 6,749,705 | B2 | 6/2004 | Skrzyniarz et al. |
| 6,838,187 | B2 | 1/2005 | Figiel et al. |
| 2002/0094403 | A1 | 7/2002 | Ishikawa et al. |

(Continued)

FOREIGN PATENT DOCUMENTS

| | | |
|---|---|---|
| CA | 2078476 A1 | 3/1993 |
| CA | 2145938 A1 | 10/1995 |

(Continued)

OTHER PUBLICATIONS

Popil, Roman E. et al., "Adhesive level effect on corrugated board strength—experiment and FE modeling." In: International progress in paper physics seminar. Oxford, Ohio: Miami University; 2006.

(Continued)

*Primary Examiner* — Sheeba Ahmed (74) *Attorney, Agent, or Firm* — Sun Hee Lehmann (57) ABSTRACT

The adhesive composition comprising emulsion polymers and microspheres and articles made therefrom are provided. The adhesive is particularly suitable for packages for consumer products that provide sufficient strength and thermal insulation while reducing the overall basis weight of the substrates.

13 Claims, 2 Drawing Sheets

(56) References Cited

U.S. PATENT DOCUMENTS

| | | | |
|---|---|---|---|
| 2004/0033343 A1 | 2/2004 | Comeau et al. | |
| 2007/0009723 A1 | 1/2007 | Ogawa et al. | |
| 2007/0155859 A1 | 7/2007 | Song et al. | |
| 2007/0224395 A1 | 9/2007 | Rowitsch et al. | |
| 2007/0228134 A1 | 10/2007 | Cook et al. | |
| 2007/0287776 A1 | 12/2007 | Nordin et al. | |
| 2008/0118693 A1 | 5/2008 | Bilski et al. | |
| 2009/0280322 A1* | 11/2009 | Daniels et al. | 428/354 |
| 2009/0321508 A1 | 12/2009 | Fu et al. | |
| 2010/0012712 A1* | 1/2010 | Swoboda et al. | 229/400 |
| 2010/0136269 A1 | 6/2010 | Andersen et al. | |
| 2010/0139878 A1 | 6/2010 | Nicolucci | |
| 2011/0033398 A1 | 2/2011 | Cauvin et al. | |
| 2012/0015162 A1 | 1/2012 | Lion et al. | |
| 2012/0048450 A1 | 3/2012 | Fu et al. | |
| 2012/0100289 A1* | 4/2012 | Egan et al. | 427/196 |
| 2013/0160945 A1 | 6/2013 | Huang et al. | |
| 2014/0131367 A1 | 5/2014 | Bordary et al. | |

FOREIGN PATENT DOCUMENTS

| | | |
|---|---|---|
| CN | 1643100 A | 7/2005 |
| CN | 101476265 A | 7/2009 |
| EP | 1216146 B1 | 10/2005 |
| EP | 1634897 A2 | 3/2006 |
| EP | 1674543 A1 | 6/2006 |
| EP | 1780250 A1 | 5/2007 |
| JP | S6144965 A | 3/1986 |
| JP | H05239423 A | 9/1993 |
| JP | 6313163 A | 11/1994 |
| JP | H08175576 A | 7/1996 |
| JP | 9-164621 A | 6/1997 |
| JP | 09217050 A | 8/1997 |
| JP | 2001207146 A | 7/2001 |
| JP | 2003-154589 A | 5/2003 |
| JP | 2005097816 A | 4/2005 |
| JP | 2010202996 A | 9/2010 |
| WO | 9014223 A1 | 11/1990 |
| WO | 0154988 A2 | 8/2001 |
| WO | 0200800 A2 | 1/2002 |
| WO | 0231077 A2 | 4/2002 |
| WO | 2005110737 A1 | 11/2005 |
| WO | 2007142593 A1 | 12/2007 |
| WO | 2008084372 A1 | 7/2008 |

OTHER PUBLICATIONS

Popil, Roman E. et al. "Adhesive level effect on corrugated board strength—experiment and FE modeling." In: International progress in paper physics seminar. Oxford, Ohio: Miami University, 2006.

* cited by examiner

WATERBORNE ADHESIVES FOR REDUCED BASIS WEIGHT MULTILAYER SUBSTRATES AND USE THEREOF

FIELD OF THE INVENTION

The present invention relates to an adhesive and article that comprises a waterborne adhesive interposed between multilayer substrates.

BACKGROUND OF THE INVENTION

Multilayer sheet articles comprise individual substrates bonded together with adhesives. Typically, cellulosic sheet, e.g., paperboard, cardboard, paper, coated paper, films, are bonded together with waterborne adhesives to form containers for consumer products such as cups, food containers, cases, cartons, bags, boxes, envelopes, wraps, clamshells, and the like.

Heavier basis weight substrates provide better strength and thermal insulation to the article than lower basis weight substrates. However, there is an effort to decrease the basis weight of the substrates to become more environmentally and economically sound.

Reducing the basis weight negatively impacts thermal insulation and strength of the article. While microspheres are known to improve thermal insulation properties, the substrate thickness is the primary source for the thermal insulation of the article.

Microspheres have been also added to paper pulp for making reduced-weight paper and thin cardboards, as described in WO 2008/084372. However, the resultant papers are prone to out-of plane buckling when subjected to vertical stresses.

In order to improve the strength of low basis weight substrates, *Adhesive Level Effect on Corrugated Board Strength-Experiment and FE Modeling* teaches to increase the amount of adhesives interposed between the substrates. However, increasing the amount of the adhesive in the article lengthens the drying time and thereby decreases manufacturing speed. Long drying time or heaters must be used to drive the water out of the substrates, which increases energy consumption.

The present invention improves the shortcomings of packages with reduced basis weight, through the use of a waterborne adhesive composition with expanded microspheres. The present invention provides an environmentally sound package that provides sufficient strength and thermal insulation to the reduced basis-weight substrates upon which it is being applied.

SUMMARY OF THE INVENTION

The present invention relates to an adhesive composition, which provides substantially similar thermal insulation and adequate strength to substrates with reduced basis weight of up to about 26%. The present invention further provides a multilayer-substrate article that comprises the waterborne adhesive interposed between lower basis-weight substrates. In addition, the adhesive and the article require less carbon footprint, e.g., heat and trees, than conventional waterborne adhesives and multilayer substrates with heavier basis weight substrates.

In a first embodiment, there is provided an adhesive composition comprising (a) an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof; (b) a plurality of microspheres, wherein the microspheres have a volume of about 10 to about 50 V/V % of the adhesive; and optionally (c) water and (d) plasticizer. The adhesive provides a substantially similar thermal insulation and adequate strength for substrates that have a basis weight reduction of up to about 26% compared to an adhesive without the microspheres on a substrate that do not have a basis weight reduction.

Still another embodiment provides an article of manufacture, which is a multilayer substrate container that comprises a plurality of reduced basis weight substrates and a waterborne adhesive composition interposed between the substrates. The adhesive composition comprises (a) an emulsion-based polymer; (b) a plurality of microspheres, wherein the microspheres have a volume of about 10 to about 50 V/V % of the adhesive; and optionally (c) water and (d) plasticizer. The article has a substantially similar thermal insulation and adequate strength even with substrates that have about 26% less basis weight compared to an adhesive without the microspheres on a substrate that do not have a basis weight reduction.

Yet another embodiment provides a method of making a multilayer substrate package that has sufficient thermal insulation and structural integrity with reduced basis weight substrates. The steps include (a) providing a first substrate having a first and a second side; (b) preparing an adhesive composition by combining (i) an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof; (ii) a plurality of expandable microspheres, wherein the expanded microspheres have a volume of about 10 to about 50 V/V % of the adhesive; and optionally (iii) a plasticizer and (iv) water to form an adhesive; (c) applying the adhesive onto the first side of the first substrate; (d) providing a second substrate having a first and a second side; (e) contacting the first side of the second substrate directly on the adhesive; (f) applying heat or radiation to expand the expandable microspheres; and (g) drying the adhesive to form a bond adhering the first and the second substrates together. The resultant multilayer substrate with an adhesive containing the microspheres has a substantially similar thermal insulation and adequate strength with substrates that have about 26% less basis weight than a multilayer substrate without the microspheres in the adhesive.

Another embodiment provides a method of making a multilayer substrate package that has sufficient thermal insulation and structural integrity with lower basis weight substrates. The steps include (a) providing a first substrate having a first and a second side; (b) preparing an adhesive composition by combining (i) an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof; (ii) a plurality of pre-expanded microspheres, wherein the microspheres have a volume of about 10 to about 50 V/V % of the adhesive; (iii) a plasticizer and (iv) water to form an adhesive; (c) applying the adhesive onto the first side of the first substrate; (d)

providing a second substrate having a first and a second side; (e) contacting the first side of the second substrate directly on the adhesive; and (f) drying the adhesive to form a bond adhering the first and the second substrates together. The resultant multilayer substrate with an adhesive containing the microspheres has a substantially similar thermal insulation and adequate strength with substrates that have about 26% less basis weight than a multilayer substrate without the microspheres in the adhesive.

DETAILED DESCRIPTION OF THE INVENTION

The present invention provides a waterborne adhesive composition for maintaining substantially the same thermal insulation and adequate strength while reducing the basis weight of the substrates up to about 26%. The adhesive compositions described herein may be useful in multilayer sheet packages for consumer products such as cups, food containers, cases, cartons, bags, boxes, envelopes, wraps, clamshells, and the like. Through the use of the inventive adhesive composition, substantially similar thermal insulation and adequate strength can be achieved for the multilayer substrate package even with decreased basis-weight substrates. The end result is an economical and more environmentally conscious product.

The present invention is based on the discovery that a waterborne adhesive composition with a plurality of expandable microspheres provides sufficient thermal insulation and strength to lower basis weight substrates than traditional basis weight substrates. For example, the adhesive with the microspheres provides a substantially similar thermal insulation and adequate strength even when the substrate's basis weight is reduced by about 8%, about 17%, and even up to about 26%.

In a first embodiment, the invention includes an adhesive for preparing a multilayer sheet package for low basis weight substrates. The substrates may be made from any type of paper and/or plastic material. Desirably, the paper products used are recyclable materials.

The adhesive composition may be made from any number of materials. Desirably, the adhesive composition includes an emulsion polymer component, a plurality of microspheres, and optionally, plasticizer and water. The adhesive composition may further include one or more preservatives, tackifiers or fillers. Other materials that do not adversely affect the adhesive and insulating properties of the adhesive composition may be used as desired.

The adhesive composition includes an emulsion polymer component. The emulsion polymer may be present in the adhesive composition in any amount, and desirably is present in an amount of from about 50% to about 99.5 wt % by weight of the adhesive composition prior to setting of the composition. Depending on the emulsion polymer, the solid levels vary from about 40 wt % to about 60 wt %, based on the emulsion polymer. The emulsion polymer component may include any desired polymer components, including vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, vinylacrylic, styrene acrylic, acrylic, styrene butyl rubber, polyurethane and mixtures thereof. Particularly preferred emulsion polymer components are vinyl acetate ethylene dispersion and polyvinyl acetate.

The adhesive composition includes a plurality of pre-expanded or expandable microspheres. The pre-expanded microspheres are fully expanded and do not need to undergo further expansion. The expandable microspheres useful in the present invention should be capable of expanding in size in the presence of heat and/or radiation energy (including, for example, microwave, infrared, radiofrequency, and/or ultrasonic energy). The microspheres useful in the present invention include, for example, heat expandable polymeric microspheres, including those having a hydrocarbon core and a polyacrylonitrile shell (such as those sold under the trade name DUALITE®) and other similar microspheres (such as those sold under the trade name EXPANCEL®). The expandable microspheres may have any unexpanded size, including from about 12 microns to about 30 microns in diameter. In the presence of heat, the expandable microspheres of the present invention may be capable of increasing in diameter by about 3 times to about 10 times. That is, the diameter of the expandable microspheres may be expandable from about 300% of the starting diameter to about 1,000% of the starting diameter, and most desirably, the diameter of the expandable microspheres may be expandable from about 350% to about 600% of the starting diameter. Upon expansion of the microspheres in the adhesive composition, the adhesive composition becomes a foam-like material, which has improved insulation properties. It may be desired, as will be explained below, that the expansion of the microspheres takes place in a partially set adhesive composition.

The expandable microspheres have a particular temperature at which they begin to expand and a second temperature at which they have reached maximum expansion. Different grades of microspheres have different expansion temperature (Texp) and maximum expansion temperature (Tmax). For example, one particularly useful microsphere has a Texp of about 80° C. and a Tmax of about 120° C., while another useful microsphere has a Texp of about 135° C. and a Tmax of about 200° C. While any particular grade of microspheres may be used in the present invention, the Texp and Tmax of the microspheres should be taken into account when formulating and processing. Desirably, the temperature at which these microspheres begin to expand (Texp) is from about 80° C. to about 135° C. The temperature at which the microspheres have reached maximum expansion (Tmax) is desirably from about 120° C. to about 200° C.

Although the choice of the particular microspheres and their respective Texp and Tmax is not critical to the invention, the processing temperatures may be modified depending upon these temperatures. Before the adhesive composition is fully dried, these microspheres are able to move within the composition and are able to expand. Once the adhesive composition is fully dry, however, the microspheres are substantially locked in place, making expansion thereof difficult, if not impossible.

Depending upon the particular expandable microspheres used in the composition, the desired amount of the microspheres in the composition may be modified. It has been discovered that if the adhesive composition includes too high a concentration of expandable microspheres, there will be insufficient adhesion and strength upon expansion of the microspheres. However, if there is too low a concentration of expandable microspheres, there will be insufficient expansion of the resulting adhesive and thus insufficient thermal insulation. Therefore, consideration of the loading level and the expansion ratio, as well as the expansion ratio and the temperature at the loading level, must be taken into account when determining the optimal concentration of expandable microspheres in the composition. If the expansion ratio of the microspheres is lower, there may be a higher concentration in the adhesive composition, and conversely, if the expansion ratio of the microspheres is higher, there may be a lower concentration in the adhesive composition.

In preferred embodiments, it is desirable that the microspheres be present in the adhesive composition in a volume of about 10 V/V % to about 50 V/V %, preferably from about 20 V/V % to about 40 V/V %, of the adhesive after fully drying (setting). Depending on the fully expanded size of the microspheres, the amount of the expandable microspheres in the adhesive can be adjusted. For an embodiment including expandable microspheres that have a diameter expansion ratio of about 370% at Tmax, the microspheres may be present in an amount of about 0.5% to about 5% by weight of the adhesive composition prior to setting of the composition. For an embodiment including expandable microspheres that have a diameter expansion ratio of about 470% at Tmax, the microspheres may be present in an amount of about 0.5% to about 3% by weight of the adhesive composition prior to setting of the composition. In systems where there are lower heating capabilities, it may be desirable to include a higher concentration of expandable microspheres, such as up to 8% by weight of the adhesive composition prior to setting of the composition. The expansion ratio of the expandable microspheres and the loading level of the microspheres will be related to each other. Desirably, the concentration of the microspheres in the adhesive composition should fall between these two zones. This balances expansion, insulation and strength, with adhesion of the resulting foam-like adhesive.

The adhesive composition optionally includes a plasticizer. Exemplary plasticizers are dibenzoates available as BENZOFLEX®, such as diethylene glycol dibenzoate, dipropylene glycol dibenzoate, and the like.

The adhesive composition may optionally include any polar solvent, particularly water, in the formulation.

The adhesive composition optionally further includes any tackifiers, humectants, preservatives, e.g., antioxidant, biocide; filler, pigment, dye, stabilizer, rheology modifier, polyvinyl alcohol, and mixtures thereof. These components can be included in an amount of from about 0.05% to about 15% by weight of the adhesive composition prior to setting of the composition. Exemplary preservatives include 1,2-benzisothiazolin-3-one, 5-chloro-2-methyl-4-isothiazolin-3-one and 2-Methyl-4-isothiazolin-3-one. Typically, preservatives may be used in the amount of from about 0.05% to about 0.5% by weight of the adhesive composition prior to setting of the composition.

Although the adhesive can start to coalesce at room temperature, the adhesive composition may still have a high moisture content and will be substantially fluid. For adhesives with expandable microspheres, a form of energy is introduced to the adhesive to expand the microspheres before fully drying the adhesive. The form of energy is typically heat or radiation. For adhesives containing pre-expanded microspheres, no additional form of energy is necessary.

For both expandable and pre-expanded microsphere containing adhesives, heater and fan may be used to drive off the excess water to aid in drying the adhesives. In a particularly desirable embodiment of manufacturing products, the adhesive composition may be applied to the surface (or surfaces) of a substrate and subjected to heat sufficient to coalesce the adhesive. At the onset of adhesive coalescence and while the adhesive is still substantially fluid-like, the adhesive may aid in holding the adhesive and microspheres in place, but will allow the microspheres the freedom to expand. The heat may then be raised to a temperature sufficient to expand the microspheres. It is preferable for the heater to be set to a temperature range between the Texp and Tmax of the microspheres. Finally, the heat may be raised again to a temperature sufficient to fully drive the water off the adhesive composition. Heat may be applied by any desired method, including in an oven or through the use of heated rollers. It should be noted that the various stages (onset of setting, expansion of the microspheres, and fully drying the adhesive) may be achieved by radiation energy, either as a replacement for, or in addition to, direct heat. That is, for example, the various steps may be achieved by use of microwave or radiofrequency radiation. In addition, the process may include any combination of heat application and radiation application. For example, the initial coalesence of the adhesive may be achieved through direct heat, while the expansion of the microspheres may be achieved through application of radiation energy.

Other additives may be included in the composition to increase the coalescence of the adhesive, is desired.

Figure 1:
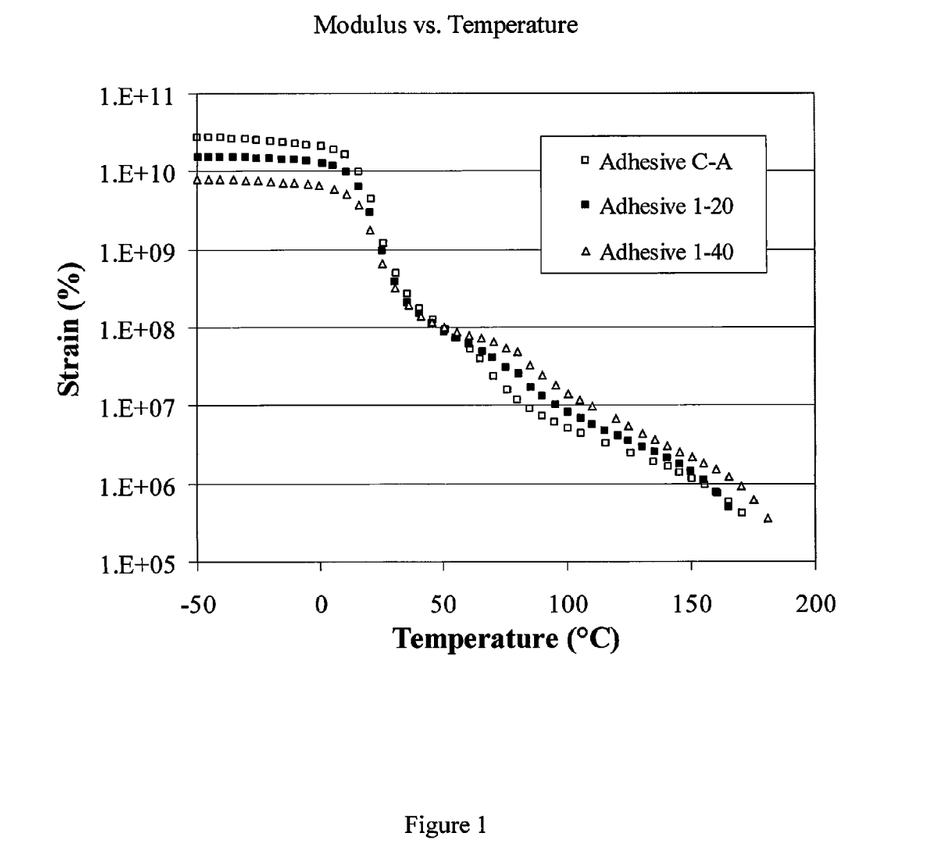
FIG. 1 is a modulus-temperature curve of adhesive samples.

The inventive adhesive with the microspheres has higher strength than adhesive without the microspheres at elevated temperatures. It is expected to those skilled in the art that the strength of the adhesive lessens with the addition of microspheres at elevated temperature. Surprisingly, the inventive adhesive has higher modulus with higher loadings of microspheres than adhesives without any microspheres at temperatures ranging from about 50° C. to about 180° C., as shown in FIG. 1. The inventive adhesive is particularly suitable for insulative packages that are typically directed for use at elevated temperatures and requires thermal insulation.

The present invention provides a method of preparing an adhesive composition having an improved insulation and adequate strength for low basis weight substrates. One method includes combining an emulsion polymer component, a plurality of expandable microspheres, and optional plasticizers, and polar solvents, tackifiers, humectants, preservatives or fillers to form a mixture. Another method includes first combining an emulsion polymer component, and optional plasticizers, polar solvents, tackifiers, humectants, preservatives or fillers to form a mixture, and then adding a plurality of pre-expanded microspheres to the mixture. Both adhesives may be formed immediately prior to applying onto a substrate or pre-made in advance and stored until needed.

Another embodiment is directed to insulated packages and a method for forming insulated packages, particularly, with low basis weight substrates. The packages include cups, food containers, cases, cartons, bags, boxes, envelopes, wraps, clamshells, and the like. It is particularly preferred that the substrates of the packages have a reduced basis weight, caliper, and fiber content as compared to traditional substrates used for the same packages. Packages made from lower basis weight and fiber content substrates are expected to lack important performance characteristics, such as strength and thermal insulation. Through the use of the inventive adhesive, including the emulsion polymer, plurality of expandable or pre-expanded microspheres, and optional polar solvent, plasticizer, preservatives, tackifiers, or fillers, the packages have adequate thermal insulation and strength even with the reduction of about 8%, about 17% or even up to about 26% of substrate's basis weight.

The substrates include reduced basis weight fiberboards, chipboards, corrugated boards, corrugated mediums, solid bleached boards (SBB), solid bleached sulphite boards (SBS), solid unbleached board (SLB), white lined chipboards (WLC), kraft papers, kraft boards, coated papers, binder boards, and oriented polypropylene films Depending upon the substrate, the basis weight differs.

It has been discovered that through the use of the present adhesive composition, the basis weight of the substrates can be decreased by up to about 7%, about 18% and even up to about 26% without sacrificing strength and thermal insulation properties as compared to traditional substrates without any reduction in basis weight. Thus, packages can be formed with lower basis weight substrates, thinner caliper, and lower fiber content, resulting in reduced cost and also reduced waste.

One exemplary consumer package is a corrugated box package formed with lower basis weight liner and medium. For a single faced corrugated board, the package comprises a fluted medium substrate and a liner board substrate adhered together with the inventive adhesive, comprising emulsion polymer, a plurality of expandable microspheres, and optionally a polar solvent, plasticizers, preservatives and fillers, where the plurality of expandable microspheres has been expanded and the adhesive composition has been set or cured. The substrates are made of paper that has a reduced basis weight when compared to traditional insulating corrugated boards. Any type of paper may be used in the invention, for example, the paper may have a basis weight ranging from about 2 to about 35 pounds per 1000 ft$^2$. In addition, it is desirable to use lower weight paper than that which is traditionally used in insulating products.

For a single faced corrugated board, the adhesive composition is applied to the tips of the flutes of only one side of the lower basis weight medium, and the first side of one lower basis weight paper or film liner is applied thereon. After the adhesive composition has been applied to the tips of the flutes of the first side of the medium, the tips of the flutes are contacted with the first side of the first paper or film liner. It is desirable that the contacting be performed under a slight pressure, so as to effectively join the medium and the paper or film liner, but excessive pressure is to be avoided (to avoid squeezing out the adhesive from the point of contact). A skilled artisan can determine this amount of pressure without undue experimentation. At this point, an unset corrugated product is formed, where the paper or film liner and the medium are secured to each other via the adhesive, but the adhesive has not been set. If desired, the unset corrugated product may be exposed to heat and/or radiation energy sufficient to begin coalescing the adhesive, but insufficient to expand the plurality of expandable microspheres. Coalescing the adhesive is useful in holding the various components of the product in place until the adhesive is fully dried (set).

The corrugated product is then exposed to heat (e.g., in an oven or via contact with heated rollers) and/or radiation energy (for example, microwave, infrared, radiofrequency, or ultrasonic energy) to expand the plurality of microspheres. In one embodiment, the corrugated product is exposed to heat at a temperature sufficient to expand at least a majority of the microspheres on the tip of one flute, but the temperature is insufficient to fully set the adhesive composition. Typically, such temperature ranges from $T_{exp}$ to $T_{max}$. In another embodiment, the unset corrugated product is exposed to microwave or infrared energy sufficient to expand at least a majority of the expandable microspheres, but at an energy level that will not fully set the adhesive composition. The resulting product is an uncured corrugated product having expanded microspheres.

As can be understood, at this point in the process, the microspheres at any given flute tip have expanded to form a foam-like adhesive composition, generating an increased space between the flute tip and the paper or film liner. Thus, during the manufacturing process, it is important that the adhesive composition be permitted to expand. That is, any pressure holding the first paper or film liner and the medium must not be so great to prohibit expansion of the adhesive and thus separation of the paper or film liner and the medium. If the pressure is so great, the adhesive may expand to the side, i.e., into the air space between the medium and the paper or film liner. A skilled artisan can determine this amount of pressure without undue experimentation. In addition, any heat and/or radiation energy applied to the product should not be so great as to fully set the adhesive composition, allowing the microspheres to expand. It is desirable that the expanded adhesive composition be located at each of the flute tips at the point of contact with the liner, thus providing insulation space between the first paper or film liner and the medium at the site of contact.

After expansion of the microspheres, the corrugated product having expanded microspheres may then be exposed to further heat and/or radiation energy (including microwave or infrared energy) sufficient to fully dry the adhesive composition. The result is a corrugated paper having improved thermal insulation and adequate strength with a reduction of up to about 7%, about 18%, and even up to about 26% in basis weight of the substrates.

The method described above provides a single-faced corrugated board. However, the above method may further be used to provide a double-faced corrugated board. The present invention may be used in a number of various applications other than single or double faced corrugated board. Other applications in which the invention is useful include doubleback corrugator with higher viscosity, coater applications with lower viscosity, and the like. In addition to the above steps, a second substantially flat paper or film liner may be provided. The second liner may be applied to the second side of the medium at the same time as the first liner is applied to the first side of the medium, or the second liner may be applied to the second side of the medium after the first liner is adhered to the medium. It may be desirable that the second liner be applied to the second side of the medium after the first liner has been fully adhered to the medium. The processing and setting steps as described above may be repeated with the second liner to provide a double-faced corrugated board.

In an alternate embodiment, there is provided a multilayer substrate package that has no medium, and a method for forming an insulating paper product that has no medium. Removing the medium results in a product that uses less than half of the paper traditionally required, which would significantly reduce the cost associated with the product and also reduces the waste generated by more than half. Heretofore, it has been difficult to achieve a product that has the necessary thermal insulation and strength without including the medium layer.

In one embodiment, there is provided an insulating sheet including a substantially flat paper or film liner having a first side and a second side. The first side of the paper or film liner includes a plurality of expandable microspheres secured thereto in an adhesive composition, where the plurality of expandable microspheres has been expanded and the adhesive composition has been dried. Thus, the product includes a paper or film liner having an adhered, foam-like composition on the first side thereof. The expandable microspheres include those described above, and the adhesive composition includes the components described above, including the emulsion polymer, and optional polar solvent, plasticizer, humectants, preservatives, or fillers.

The adhesive composition may be applied to the first surface of the paper or film liner in any configuration desired, including in a series of dots, stripes, waves, checkerboard patterns, any general polyhedron shapes that have substantially flat bases, and combinations thereof. Application of these patterns decreases the amount of adhesive in the packages. Further, the adhesive composition may be applied to the first surface in a series of cylinders. In addition, if desired, the adhesive composition may be applied to the first surface as a substantially flat sheet of adhesive covering the entire first surface (full lamination) or covering a portion of the first surface. The adhesive composition may be applied in the presence of heat if desired; however, it is important that the heat at application not be so high as to fully set the adhesive composition before expanding the expandable microspheres. A skilled artisan can determine this amount of pressure without undue experimentation. Optionally, a second paper or film liner may be applied to the top surface of the adhesive composition, forming a sandwiched configuration of: first paper or film liner—adhesive with expanded microspheres—second paper or film liner.

After the adhesive composition has been applied to the first side of the paper or film liner, in one alternative, the paper or film liner with wet adhesive thereon may be exposed to heat and/or radiation energy to begin coalescing the adhesive composition. The adhesive composition therefore locks in the components, including the plurality of microspheres, in place and adheres them to the surface of the paper or film liner. It may be desired to only partially dry the adhesive composition, to the point that the composition locks in the components and maintains them sticking to the surface of the paper or film liner, but is not completely dry. A skilled artisan can determine state without undue experimentation. As explained above, only partially drying the adhesive composition (i.e., leaving a higher amount of moisture in the adhesive, such as at least 10% moisture content) allows the expandable microspheres to expand.

After the adhesive begins to coalsece, the paper or film liner is then exposed to heat and/or radiation energy sufficient to expand the plurality of microspheres. In one embodiment, the paper or film liner with wet adhesive thereon is exposed to heat at a temperature sufficient to expand at least a majority of the microspheres, in between the ranges of Texp and Tmax. In another embodiment, the paper or film liner with wet adhesive thereon is exposed to microwave or infrared energy sufficient to expand at least a majority of the expandable microspheres. The resulting product is a paper or film liner having an adhesive having expanded microspheres therein. The adhesive composition may then be exposed to heat and/or radiation energy sufficient to fully set the adhesive composition.

If desired, after application of the adhesive composition to the first side of the paper or film liner, a second paper or film liner having a first side and second side may be provided and the first side of the second paper or film liner applied to the surface of the applied adhesive composition, forming a sandwich configuration. Thereafter, expansion of the microspheres and setting of the adhesive may take place as explained above.

Figure 2:
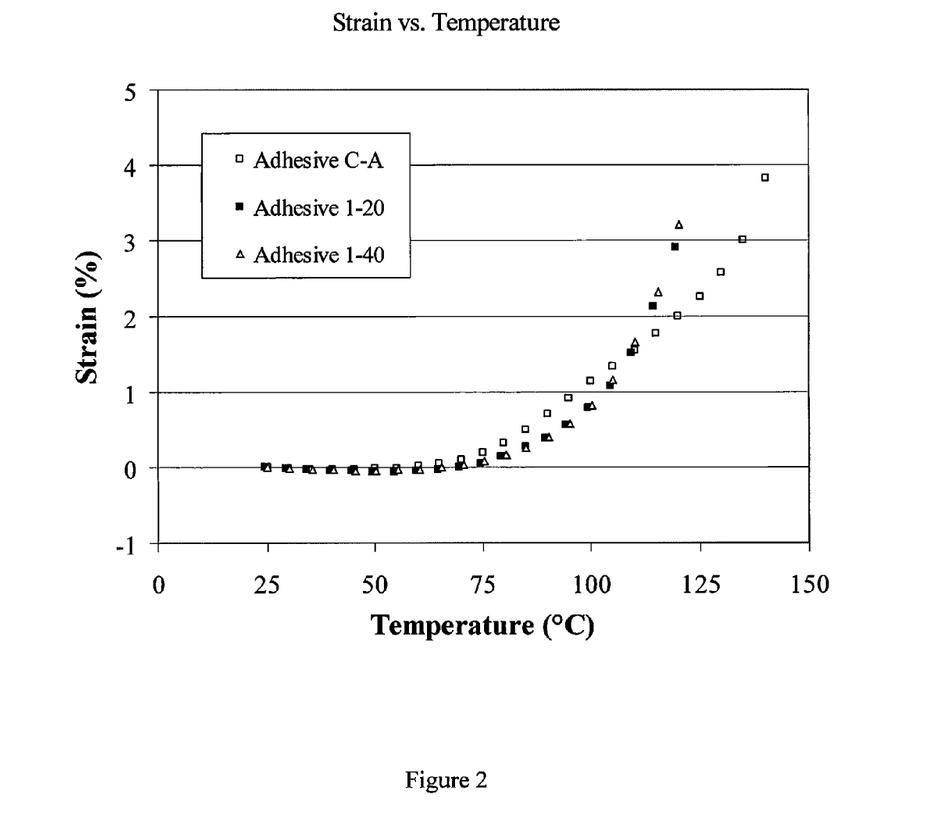
FIG. 2 is a strain-temperature curve with constant stress of lap shear samples.

Multilayer substrate packages formed with the inventive adhesives containing microspheres improve the ability of the package to withstand strain under a constant stress at elevated temperatures. It is expected to those skilled in the art that the strain of the adhesive increases with the addition of microspheres at elevated temperature. Surprisingly, multilayer substrates with higher amount of microspheres have lower strain at elevated temperature than adhesives without any microspheres at temperatures ranging from about 50° C. to about 110° C., as shown in FIG. 2. The inventive adhesive is particularly suitable for consumer packages that are typically directed for use at elevated temperatures.

The present invention may be better understood through analysis of the following examples, which are non-limiting and are intended only to help explain the invention.

EXAMPLES

Example 1

Formation of an Adhesive

Each adhesive was made by combining the components in Table 1 and then stirring for about an hour or until the mixture became homogenous.

TABLE 1

| Adhesive Sample | Emulsion polymer | | Microsphere | |
|---|---|---|---|---|
| | | Solids content (%) | | Microsphere volume in adhesive (V/V %) |
| Comparative Adhesive A (C-A) | Polyvinyl alcohol stabilized ethylene copolymer acetate | 55-56 | Dualite ® E065-135D | 0 |
| Adhesive 1-20 | Polyvinyl alcohol stabilized ethylene copolymer acetate | 55-56 | Dualite ® E065-135D | 20 |
| Adhesive 1-40 | Polyvinyl alcohol stabilized ethylene copolymer acetate | 55-56 | Dualite ® E065-135D | 40 |
| Comparative Adhesive B (C-B) | Polyvinyl alcohol stabilized vinyl acetate homopolymer | 55-57 | Dualite ® E065-135D | 0 |
| Adhesive 2-20 | Polyvinyl alcohol stabilized vinyl acetate homopolymer | 55-57 | Dualite ® E065-135D | 20 |

TABLE 1-continued

| Adhesive Sample | Emulsion polymer | | Microsphere | |
|---|---|---|---|---|
| | | Solids content (%) | | Microsphere volume in adhesive (V/V %) |
| Adhesive 2-40 | Polyvinyl alcohol stabilized vinyl acetate homopolymer | 55-57 | Dualite ® E065-135D | 40 |

Example 2

Formation of Multilayer Substrates

Multilayer substrates were formed with various basis weight substrates and the adhesives listed in Table 1. The paperboard substrates, and their caliper (thickness measured by a digital micrometer) and basis weights (obtained by weighing a 12"×12" substrate) are listed on Table 2. The designated adhesive sample was applied in between the top and bottom substrates with either a full lamination with a #15 Meyer rod (1.5 mil) or stenciled (patterned) with 5/64 inch holes in an array of 0.25 inch grid size) and with the specified add-on levels to form the multilayer substrate 1-9. Comparative samples, C1-C7, were also formed with comparative adhesives. Substrates, alone, were also tested for comparative purpose.

The calipers, basis weights, edge crush tests (ECT) and surface temperatures were measured for all of the structures, listed in Table 2. The calipers and basis weights were measured as described above. The ECTs were measured to determine the strength of the multilayer substrates by following the TAPPI Test Method T-839 pm95, on a Lorentzen & Wettre Tester (Mode #5) with ECT holding fixture model 08-25-25. The Surface temperatures were also measured to assess the thermal insulation of the multilayer substrates. Surface temperature was measured with the Infrared Cameras Inc.'s ICI-7320 USB camera and the accompanying IR Flash software (version 2.12.12.7). The camera was positioned 16.5 inch away from the hotplate surface and test specimens (3×3 inch of the structure) was positioned ¾ inch away from a 55° C. precision hot plate in a wooden fixture.

TABLE 2

| Structure | Top Substrate | | Bottom Substrate | | Adhesive | | | Multilayer Substrate | | | | |
|---|---|---|---|---|---|---|---|---|---|---|---|---|
| | Caliper mil | Basis Weight lb/msf* | Caliper mil | Basis Weight lb/msf* | Adhesive Type | Coating | Add-on lb/msf* | Basis Weight lb/msf* | ECT Lbs | Surface Temperature (° C.) | | |
| | | | | | | | | | | 30 sec | 60 sec | 120 sec |
| C1 | 14 | 57.5 | 16 | 63 | C-A | Full | 1.5 | 122 | 65 | 30 | 34 | 36 |
| C2 | 14 | 57.5 | 16 | 63 | C-B | Full | 1.5 | 122 | 91 | 30 | 34 | 36 |
| C3 | 12 | 49.5 | 24 | 84.5 | C-A | Full | 1.5 | 135.5 | 88 | 29 | 32 | 35 |
| C4 | 12 | 49.5 | 24 | 84.5 | C-B | Full | 1.5 | 135.5 | 101 | 29 | 33 | 35 |
| C5 | 12 | 49.5 | 12 | 49.5 | C-A | Full | 4 | 103 | 51 | 30 | 34 | 36 |
| C6 | 12 | 49.5 | 14 | 57.5 | C-A | Full | 2 | 109 | 50 | 30 | 35 | 37 |
| C7 | 12 | 49.5 | 16 | 63 | C-A | Full | 2 | 114.5 | 62 | 31 | 35 | 37 |
| 1 | 12 | 49.5 | 12 | 49.5 | Jan-40 | Pattern | 5 | 104 | 32 | 30 | 33 | 36 |
| 2 | 12 | 49.5 | 14 | 57.5 | Jan-40 | Pattern | 3 | 110 | 31 | 31 | 34 | 36 |
| 3 | 12 | 49.5 | 16 | 63 | Jan-40 | Pattern | 3.5 | 116 | 37 | 30 | 35 | 36 |
| 4 | 12 | 49.5 | 12 | 49.5 | Feb-40 | Pattern | 2.5 | 101.5 | 30 | 30 | 34 | 36 |
| 5 | 12 | 49.5 | 14 | 57.5 | Feb-40 | Pattern | 1.5 | 108.5 | 36 | 30 | 34 | 36 |
| 6 | 12 | 49.5 | 16 | 63 | Feb-40 | Pattern | 1.5 | 114 | 42 | 30 | 34 | 36 |
| 7 | 12 | 49.5 | 12 | 49.5 | 20-Jan | Pattern | 6 | 105 | 50 | 30 | 34 | 36 |
| 8 | 12 | 49.5 | 14 | 57.5 | 20-Jan | Pattern | 6 | 113 | 36 | 31 | 35 | 37 |
| 9 | 12 | 49.5 | 16 | 63 | 20-Jan | Pattern | 3.5 | 116 | 41 | 30 | 34 | 36 |
| S1 | 12 | 49.5 | none | none | N/A | N/A | N/A | 49.5 | 15 | 33 | 35 | 37 |
| S2 | 14 | 57.5 | none | none | N/A | N/A | N/A | 57.5 | 22 | 34 | 37 | 37 |
| S3 | 16 | 63 | none | none | N/A | N/A | N/A | 63 | 17 | 33 | 37 | 37 |
| S4 | 24 | 84.5 | none | none | N/A | N/A | N/A | 84.5 | 65 | 31 | 34 | 36 | lbs/msf = pounds per thousand square feet

The adhesive was applied in a pattern for Structures 1-9 and the adhesive was fully laminated for Comparative Samples C1-C7. Even with the patterned adhesive, the Structures had substantially similar thermal properties.

The use of the inventive adhesive lowered the overall basis weight of the multilayer substrate. In fact, the use of the inventive adhesive reduced the basis weight of the substrate to about 7% (comparison between Structure 1 and C6), about 18% (comparison between Structure 1 and C7), and even up to 26% (comparison between Structure 1 and C3) with substantially similar thermal properties and acceptable strength.

Multilayer samples, Structures 1-9 had substantially similar surface temperatures even with lower caliper and lower basis weight substrates than the comparative structures. Substantially similar thermal insulation is defined as being within 2° C. of Surface Temperature at 30 sec, 60 sec, and 90 sec at ¾" away from a heat source. The structures formed with lower basis weight had less than 2° C. separation than comparative structures made with thicker basis weight substrates without any microspheres in the adhesive at 30 sec, 60 sec and 90 sec. In fact, multilayer structures with patterned adhesive, without full lamination, had similar thermal insulation as samples with fully laminated adhesive with much higher basis weight substrates. Also, adhesives with 40V/V % microspheres had better thermal insulation (lower temperature from the surface temperature measurement) than 20 V/V % microspheres.

Acceptable edge crush test is greater than 30 lbs for the structure. The multilayer substrates with fully laminated adhesive had higher edge crush test values than those multilayer substrates with patterns, however, both laminated samples had equal to or higher than 30 lbs edge crush test values. Furthermore, higher volume of microspheres in the adhesive resulted in lower edge crush test values, but again, the samples with higher volume of microspheres had equal to or higher than 30 lbs edge crush test values.

Example 3

Modulus of the Adhesive at Elevated Temperatures

Comparative Adhesive A, Adhesive 1-20 and Adhesive 1-40 of Table 1 were casted as 5 mil films and the dried. The adhesive samples were measured by TA Instruments DMA Q-800 Dynamic Mechanical Analyzer and the modulus was measured over −50° C. to 180° C. FIG. 1 shows that adhesives with the microspheres had higher strength (higher modulus) at elevated temperatures of about 5° C. to about 175° C. than the adhesive without any microspheres. Moreover, adhesive with highest volume of microspheres had the highest strength.

Example 4

Bond Strain (Percent) at Elevated Temperature, Under Constant Stress

Lap bonds were prepared by joining 12pt SBS with a half inch draw down of 5 mil of the Comparative Adhesive A, Adhesive 1-20 and Adhesive 1-40 of Table 1. The strain (relative elongation) was measured over −20° C. to 140° C. under constant one kilogram stress. Dried lap bonds were cut into 7 mm stripes and tested on DMA Q-800. As demonstrated in FIG. 2, the strain was lower for adhesives with microspheres than without any microspheres at elevated temperatures, particularly from about 50° C. to about 110° C.

The invention claimed is:

1. An article comprising a first substrate, a second substrate, and an adhesive interposed between the two substrates comprising:
    (a) an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, styrene butyl rubber, polyurethane and mixtures thereof;
    (b) about a plurality of microspheres, wherein the microspheres have a volume of about 10 to about 40 V/V % in the adhesive; and
    (c) optionally, water, plasticizer, preservative;
        wherein the article has a substantially similar thermal insulation loss with about 26% decrease in substrate basis weight than an article without any microspheres; and
        wherein the article is a cup, food container, case, carton, bag, box, envelope, wrap or clamshell.

2. The article of claim 1, wherein the thermal insulation loss is less than about 2° C. at 30 seconds and ¾ inch away from a heat source.

3. The article of claim 1, wherein the basis weight of the substrates range from 2 to about 35 pounds per 1000 ft$^2$.

4. The article of claim 1, wherein the first and the second substrate are composed of fiberboard, corrugated board, solid bleached boards, kraft paper, coated paper or oriented polypropylene film.

5. The article of claim 4 wherein the first and the second substrate are kraft paper or coated paper.

6. The article of claim 4 wherein the boards and papers comprise a portion of recycled fiber.

7. The article of claim 1, wherein the emulsion-based polymer is selected from the group consisting of vinyl acetate ethylene dispersion and polyvinyl acetate.

8. The article of claim 1, wherein the plurality of microspheres are present in an amount of from about 0.5 wt % to about 5 wt %, based on the total weight of the adhesive.

9. The article of claim 1, wherein the microspheres are expandable polymeric microspheres.

10. The article of claim 9, wherein the microspheres have a temperature expansion ($T_{exp}$) of about 80° C. to about 135° C.

11. The article of claim 9, wherein the microspheres have a maximum expansion temperature ($T_{max}$) of about 120° C. to about 200° C.

12. The article of claim 1, wherein the microspheres are pre-expanded polymeric microspheres.

13. The article of claim 1, wherein the adhesive further comprises a filler, pigment, dye, stabilizer, rheology modifier, polyvinyl alcohol, humectant or a mixture thereof.

* * * * *